US009946100B2

(12) United States Patent
Yanagawa et al.

(10) Patent No.: US 9,946,100 B2
(45) Date of Patent: Apr. 17, 2018

(54) WAVEGUIDE TYPE OPTICAL ELEMENT

(71) Applicant: Sumitomo Osaka Cement Co., Ltd, Tokyo (JP)

(72) Inventors: Teppei Yanagawa, Tokyo (JP); Katsutoshi Kondou, Tokyo (JP); Tetsuya Fujino, Tokyo (JP); Junichiro Ichikawa, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 15/516,196

(22) PCT Filed: Mar. 24, 2016

(86) PCT No.: PCT/JP2016/059334
§ 371 (c)(1),
(2) Date: Mar. 31, 2017

(87) PCT Pub. No.: WO2016/158650
PCT Pub. Date: Oct. 6, 2016

(65) Prior Publication Data
US 2018/0011348 A1 Jan. 11, 2018

(30) Foreign Application Priority Data
Mar. 31, 2015 (JP) ................................ 2015-071159

(51) Int. Cl.
*G02F 1/03* (2006.01)
*G02F 1/225* (2006.01)
(Continued)

(52) U.S. Cl.
CPC ............ *G02F 1/0327* (2013.01); *G02F 1/035* (2013.01); *G02F 1/0316* (2013.01); *G02F 1/225* (2013.01);
(Continued)

(58) Field of Classification Search
CPC ...... G02F 1/0327; G02F 1/0316; G02F 1/225; G02F 1/035; G02F 2001/212; G02F 2001/12; G02F 2201/20
See application file for complete search history.

(56) References Cited

U.S. PATENT DOCUMENTS 5,404,412 A    4/1995  Seino et al.
5,680,497 A    10/1997 Seino et al.
(Continued)

FOREIGN PATENT DOCUMENTS

JP    H05224163 A    9/1993
JP    H05257105 A    10/1993
(Continued)

OTHER PUBLICATIONS

International Search Report for PCT/JP2016/059334 dated Jun. 21, 2016.
(Continued)

*Primary Examiner* — Ryan Lepisto
*Assistant Examiner* — Erin Chiem
(74) *Attorney, Agent, or Firm* — Thomas F. Quinn, Jr.

(57) ABSTRACT

To effectively prevent the acceleration of the drift phenomenon generated by the application of a high electric field to a substrate through a bias electrode in a waveguide type optical element. A waveguide type optical element includes a substrate (100) having an electro-optic effect, two optical waveguides (104 and 106) disposed on a surface of the substrate, a non-conductive layer (120) which is disposed on the substrate and is made of a material having a lower dielectric constant than the substrate, and a control electrode (150) which is disposed on the non-conductive layer and is intended to generate a refractive index difference between the two optical waveguides by respectively applying electric fields to the two optical waveguides, and the non-conductive
(Continued)

layer is constituted of a material which includes silicon oxide, an oxide of indium, and an oxide of titanium and has a ratio between a molar concentration of the titanium oxide and a molar concentration of indium oxide of 1.2 or more, and a voltage generating an electric field of 1 V/μm or more in the substrate is applied to the control electrode.

5 Claims, 3 Drawing Sheets

(51) Int. Cl.
    *G02F 1/035*     (2006.01)
    *G02F 1/21*     (2006.01)
    *G02B 6/42*     (2006.01)
(52) U.S. Cl.
    CPC .......... *G02B 6/42* (2013.01); *G02F 2001/212* (2013.01); *G02F 2201/12* (2013.01); *G02F 2202/20* (2013.01)

(56) References Cited

U.S. PATENT DOCUMENTS 7,231,101 B2    6/2007    Nagata
7,418,173 B2 *    8/2008    Abe ...................... G02F 1/0147
                                                                                                 385/39

FOREIGN PATENT DOCUMENTS

| JP | 2006301593 A | 11/2006 |
| JP | 2007122038 A | 5/2007 |
| JP | 2008242042 A | 9/2008 |

OTHER PUBLICATIONS

Office Action for PCT/JP2016/059334/JP2015-071159 dated Jun. 13, 2016, from Japanese Patent Office.

* cited by examiner

WAVEGUIDE TYPE OPTICAL ELEMENT

TECHNICAL FIELD

The present invention relates to a method for driving a waveguide type optical element having optical waveguides and an electrode for controlling optical waves that are transmitted through the optical waveguides and particularly to a waveguide type optical element having a bias electrode for compensating for so-called drift.

BACKGROUND ART

In recent years, in the field of optical communication or optical measurement, a waveguide type optical element such as an optical modulator having optical waveguides disposed on a substrate having an electro-optic effect has been frequently used. Generally, a waveguide type optical element has the optical waveguide and an electrode for controlling optical waves that are transmitted through the optical waveguide.

As the above-described waveguide type optical element, for example, a Mach-Zehnder-type optical modulator in which lithium niobate ($LiNbO_3$) (also referred to as "LN"), which is a ferroelectric crystal, is used as the substrate is widely used. A Mach-Zehnder-type optical modulators has a Mach-Zehnder-type optical waveguide consisting of an input waveguide for introducing light from outside, a branching section for transmitting the light introduced through the input waveguide to divide into two paths, two parallel waveguides for transmitting the respective branched lights toward latter part of the branching section, and an output waveguide for combining the lights that are transmitted through the two parallel waveguides and outputting to outside. In addition, a Mach-Zehnder-type optical modulator has an electrode for shifting and controlling the phases of optical waves that are transmitted through the parallel waveguides using an electro-optic effect by applying voltage thereto. Generally, the electrode is constituted of a radio frequency (RF)-signal electrode disposed on or above the parallel waveguides or near the parallel waveguides (hereinafter, referred to as "RF electrode") and ground electrodes disposed away from the RF electrode.

In a Mach-Zehnder-type optical modulator in which LN is used as the substrate, the optical output characteristics with respect to applied voltage shifts due to a so-called DC drift phenomenon or temperature drift phenomenon, and thus, for example, optical modulation waveforms output from the modulator are distorted, and change of the modulation characteristics may occur (for example, deterioration of the waveform quality).

As a method for preventing the change of the modulation characteristics caused by those drift phenomena, a method in which, in addition to the RF electrode and the ground electrode for applying a radio-frequency signal voltage, a bias electrode is disposed along the parallel waveguides, and a suitable voltage is appropriately applied to the bias electrode, thereby compensating for the amount of voltage shift caused by the above-described drift phenomena (hereinafter, also referred to as "DC drift voltage") is known (Patent Literature 1).

That is, the amount of voltage shift is adjusted by generating an appropriate refractive index difference between the two parallel waveguides by applying a voltage to the bias electrode.

In addition, as a technique for diminishing the drift phenomenon, it is known that a buffer layer is made of a transparent insulator of a mixture between silicon oxide and an oxide of or an oxide of at least one further element selected from the group consisting of the metal elements of the Groups III to VIII, Ib and IIb of the Periodic Table or an oxide of at least one further element selected from the above-mentioned metal elements and semiconductor elements (Patent Literature 2). This constitution is a useful technique since negative DC drift characteristics appear in the beginning with lapse of time and, additionally, movement of movable electrons and ions is affected by the additives, and thus it is possible to flatten an increase of DC drift, compared with conventional one, so that DC drift characteristics are improved for a long period of time.

However, in the above-described related art, in a case in which the RF electrode and the bias electrode are individually disposed along the parallel waveguides with a length limited by size and the like of the waveguide type optical element, the length of the RF electrode makes longer in order to lower the half-wavelength voltage ($V\pi$) in a Mach-Zehnder-type optical modulator and, as the result, there is a case in which the length of the bias electrode becomes shorter. In such a case, the electric field required to generate a desired refractive index difference between the parallel waveguides becomes larger, and thus the applied voltage to the bias electrode also becomes higher.

As a result, a phenomenon in which the above-described drift phenomenon is accelerated due to a high electric field applied to an LN substrate through the bias electrode may occur.

CITATION LIST

Patent Literature

[Patent Literature No. 1] Japanese Laid-open Patent Publication No. H5-224163
[Patent Literature No. 2] Japanese Laid-open Patent Publication No. H5-257105

SUMMARY OF INVENTION

Technical Problem

In response to the above-described background, in waveguide type optical elements having a bias electrode, realization of a constitution capable of effectively preventing the acceleration of the drift phenomenon caused by applying higher electric field to the substrate through the bias electrode.

Solution to Problem

An aspect of the present invention is a waveguide type optical element, the waveguide type optical element comprises a substrate having an electro-optic effect, two optical waveguides disposed on a surface of the substrate, a non-conductive layer which is disposed on the substrate and is made of a material with a lower dielectric constant than the substrate, and a control electrode which is disposed on the non-conductive layer and is intended to generate a refractive index difference between the two optical waveguides by respectively applying electric fields to the two optical waveguides, and the non-conductive layer is constituted of a material which is made of silicon oxide, an oxide of indium, and an oxide of titanium and has a ratio between a molar concentration of the titanium oxide and a molar concentration of indium oxide of 1.2 or more.

According to another aspect of the present invention, the control electrode is constituted of a base layer that is disposed on the non-conductive layer and an upper layer that is disposed on the base layer.

According to a further aspect of the present invention, the substrate is made of lithium niobate, the two optical waveguides are two parallel waveguides constituting a Mach-Zehnder-type optical waveguide, and the control electrode is a bias electrode for compensating for a drift phenomenon.

DESCRIPTION OF EMBODIMENTS

Hereinafter, an embodiment of the present invention will be described with reference to the accompanying drawings.

Figure 1:
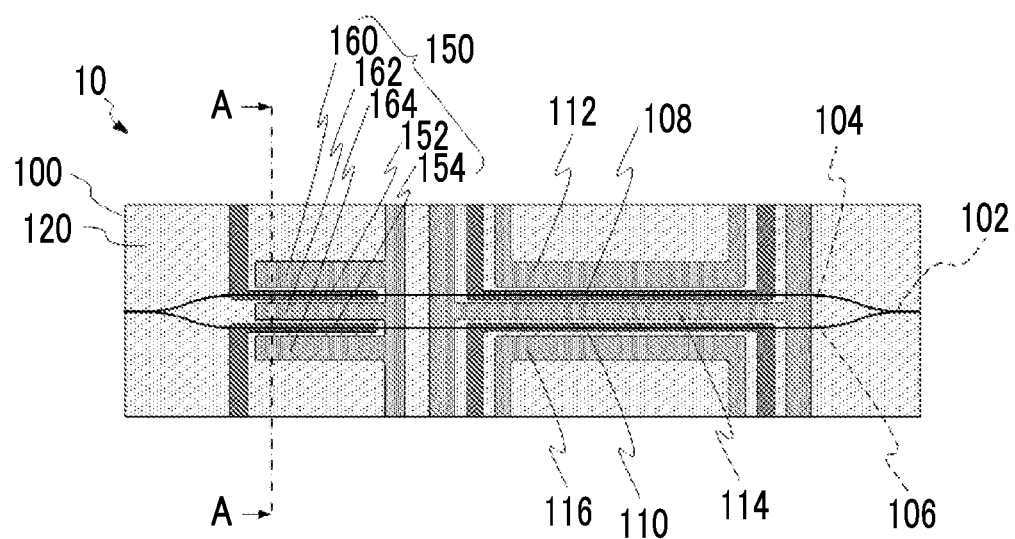
FIG. 1 is a view illustrating the constitution of a waveguide type optical element according to an embodiment of the present invention.

FIG. 1 is a view illustrating the constitution of a waveguide type optical element according to an embodiment of the present invention.

The present waveguide type optical element 10 is a Mach-Zehnder-type optical modulator in which a Mach-Zehnder (MZ)-type optical waveguide 102 is disposed on a substrate 100.

The substrate 100 is a substrate made of lithium niobate (LN) which is an electro-optic material and is, for example, a Z-cut LN substrate. A non-conductive layer 120 made of a non-conductive material is disposed on the substrate 100. This non-conductive layer 120 can be made as, for example, a so-called buffer layer which is provided for the purpose of preventing to generate an optical loss due to absorption by an electrode 108 and the like described later and is made of, for example, a material with a lower dielectric constant than the substrate 100 (specific materials will be described later).

The MZ-type optical waveguide 102 has parallel waveguides 104 and 106. Radio frequency (RF) electrodes 108 and 110 are respectively disposed along the parallel waveguides 104 and 106 above the parallel waveguides 104 and 106, and ground electrodes 112, 114, and 116 are disposed a predetermined distance away from the RF electrodes 108 and 110 respectively so as to put the RF electrodes 108 and 110 therebetween. Radio frequency signals for controlling optical waves that are transmitted through the parallel waveguides 104 and 106 are respectively applied between the RF electrode 108 and the ground electrodes 112 and 114 and between the RF electrode 110 and the ground electrodes 114 and 116. By these radio frequency signals, light input from the left end of the MZ-type optical waveguide 102 in the drawing is modulated (for example, intensity-modulated) and is output from the right end in the drawing.

In addition, a bias electrode 150 which is a control electrode for controlling the refractive index difference between the parallel waveguides 104 and 106 by respectively applying electric fields to the two parallel waveguides 104 and 106 is disposed on the substrate 100. The bias electrode 150 is constituted of operating electrodes 152 and 154 that are respectively disposed along the parallel waveguides 104 and 106 above the parallel waveguides 104 and 106 and reference electrodes 160, 162, and 164 provided a predetermined distance away from the operating electrodes 152 and 154 respectively so as to put the operating electrodes 152 and 154 therebetween.

A potential which is a reference is applied to the reference electrodes 160, 162, and 164, and a positive voltage or a negative voltage with respect the potential which is the reference is applied to the operating electrodes 152 and 154. Therefore, a refractive index difference is generated between the parallel waveguides 104 and 106, and the amount of voltage shift (that is, the amount of voltage shift required for optical modulation operations by the RF electrodes 108 and 110) caused by the above-described drift phenomenon is compensated.

Meanwhile, the respective electrodes 108, 110, 112, 114, 116, 152, 154, 160, 162, and 164 are disposed on the non-conductive layer 120.

Figure 2:
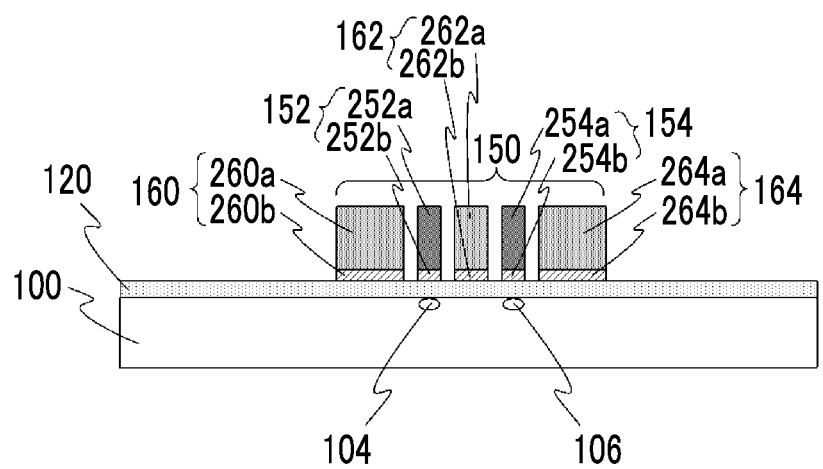
FIG. 2 is a cross-sectional view of the waveguide type optical element illustrated in FIG. 1 taken in a direction of AA.

FIG. 2 is a cross-sectional view of the waveguide type optical element 10 illustrated in FIG. 1 taken in a direction of AA. Each of the operating electrodes 152 and 154 and the reference electrodes 160, 162, and 164 which constitute the bias electrode 150 is constituted of each of the upper layers 252a, 254a, 260a, 262a, and 264a and each of the base layers 252b, 254b, 260b, 262b, and 264b which is disposed between each of the above-described upper layers and the non-conductive layer 120. The upper layers 252a, 254a, 260a, 262a, and 264a are constituted of, for example, gold (Au), and the base layers 252b, 254b, 260b, 262b, and 264b are constituted of, for example, titanium (Ti).

According to knowledge of the inventors of the invention of the present application, one of causes for the acceleration of the drift phenomenon due to a high electric field applied to the LN substrate and the like through the bias electrode is considered as the injection of carriers into a buffer layer (corresponding to the non-conductive layer 120 in the present embodiment) or the LN substrate existing under the bias electrode from the bias electrode by applying a high voltage to the bias electrode.

In addition, on the basis of the above-described knowledge, the inventors of the invention of the present application have evaluated the extent of acceleration of the drift phenomenon caused by a high electric field applied to the LN substrate through the bias electrode by variously changing the material of the buffer layer. As a result, the inventors have obtained further knowledge that, when the buffer layer is constituted to include silicon oxide, an oxide of indium, and an oxide of titanium and have a ratio between the molar concentration of the titanium oxide and the molar concentration of indium oxide in the buffer layer of 1.2 or more, it is possible to effectively suppress carriers injection into the buffer layer when an electric field (here, the electric field refers to the average electric field that is calculated by the applied voltage/the electrode gap) of approximately 1 V/μm or more is applied to the substrate.

The invention of the present application is based on the above-described knowledge, and, in the present embodiment, particularly, the non-conductive layer 120 corresponding to the buffer layer is constituted to include $SiO_2$, $In_2O_3$ which is an oxide of indium, and $TiO_2$ which is an oxide of titanium and have, for example, a molar concentration of titanium of 9.0 mol % and a molar concentration of indium of 3.4 mol % so that the ratio between the molar concentration of the titanium oxide and the molar concentration of indium oxide becomes 1.2 or more.

An example of test samples used to obtain the above-described knowledge is shown in Table 1. The constitutions of the respective samples are the same as the waveguide type optical element 10 illustrated in FIGS. 1 and 2, and Table 1 shows the molar concentration ratios (unit: mol %) of $In_2O_3$ and $TiO_2$ added to the non-conductive layer 120 including $SiO_2$ as a main material and the concentration percentages of the molar concentration ratios between $In_2O_3$ and $TiO_2$ (=[the molar concentration ratio of $TiO_2$]/[the molar concentration ratio of $In_2O_3$])

TABLE 1

|  | Sample a | Sample b | Sample c | Sample d | Sample e | Sample f |
|---|---|---|---|---|---|---|
| $In_2O_3$ (molar concentration ratio) | 3.4 | 4.0 | 4.8 | 2.7 | 5.8 | 8.3 |
| $TiO_2$ (molar concentration ratio) | 9.0 | 5.2 | 5.9 | 1.4 | 1.8 | 2.0 |
| Concentration percentage ($In_2O_3/TiO_2$) | 2.65 | 1.30 | 1.23 | 0.52 | 0.31 | 0.24 |

For each of the samples a to f, the change of the DC drift voltage against time has been measured in the following procedure.

First, light is input to one end of the MZ-type optical waveguide 102, and a positive initial bias voltage is applied only to the operating electrode 152 against the reference electrodes 160, 162, and 164 as grounding potential. In this condition, the bias voltage applied to the operating electrode 152 is adjusted so that the intensity of light output from the other end of the MZ-type optical waveguide 102 becomes constant, and the amount of the bias voltage applied to the operating electrode 152 changed from the initial bias voltage after the adjustment is recorded together with elapsed time after the initial bias voltage is started to be applied.

Next, in order to reset the history of applying voltage to the sample to the initial state, the reference electrodes 160, 162, and 164 and the operating electrode 152 are short-circuited and are left to stand for a long period of time under a high temperature. After that, in the same manner as described above, light is input to one end of the MZ-type optical waveguide 102, and a negative initial bias voltage is applied only to the operating electrode 152 against the reference electrodes 160, 162, and 164 as grounding potential. In this condition, the bias voltage applied to the operating electrode 152 is adjusted so that the intensity of light output from the other end of the MZ-type optical waveguide 102 becomes constant, and the amount of the bias voltage applied to the operating electrode 152 changed from the initial bias voltage after the adjustment is recorded together with elapsed time after the initial bias voltage is started to be applied.

Figure 3A:
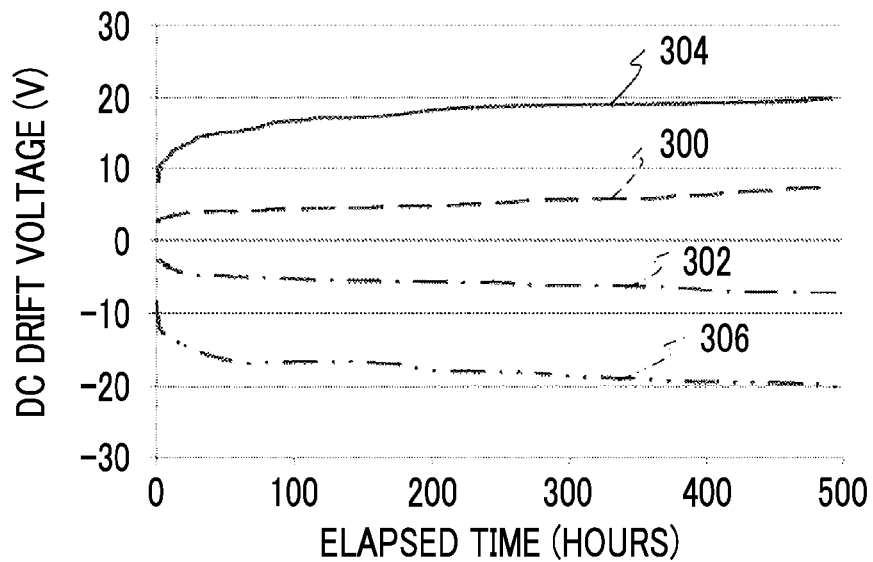
FIGS. 3A and 3B are views illustrating examples of the evaluation result of drift voltage change against elapsed time in a case in which buffer layers having a variety of compositions are used.
Figure 3B:
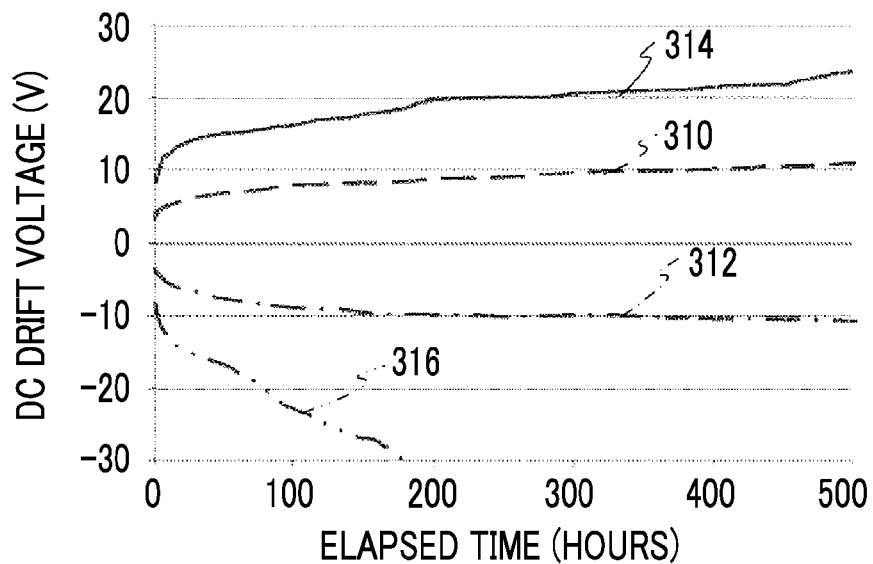

FIGS. 3A and 3B illustrate the measurement results of the changes of the drift voltages against time in the sample b and the sample e as a representative example. FIG. 3A illustrates the change of the bias voltage against time in the sample b, and FIG. 3B illustrates the change against time in the sample e.

In FIGS. 3A and 3B, the vertical axes represents the DC drift voltage (unit: V), and the horizontal axes illustrate the elapsed time (unit: hours). A curve 300 illustrated in FIG. 3A represents the change of the DC drift voltage against time measured by applying an initial bias voltage of +3.5 V to the operating electrode 152 in the sample b, and a curve 302 indicates the change of the DC drift voltage against time measured by resetting the history of applying bias voltage to the sample to the initial state and then applying an initial bias voltage of −3.5 V to the operating electrode 152. In addition, a curve 304 indicates the change of the DC drift voltage against time measured by resetting the history of applying bias voltage to the sample to the initial state and then applying an initial bias voltage of +10.0 V to the operating electrode 152, and a curve 306 indicates the change of the DC drift voltage against time measured by resetting the history of applying bias voltage to the sample to the initial state and then adding an initial bias voltage of −10.0 V to the operating electrode 152. In addition, the gap between electrodes for applying the DC bias to these samples is 14 µm, and the thickness of the buffer layer is 0.6 µm.

Similarly, a curve 310 illustrated in FIG. 3B indicates the change of the DC drift voltage against time measured by applying an initial bias voltage of +3.5 V to the operating electrode 152 in the sample e, and a curve 312 indicates the change of the DC drift voltage against time measured by resetting the history of applying bias voltage to the sample to the initial state and then applying an initial bias voltage of −3.5 V to the operating electrode 152. In addition, a curve 314 indicates the change of the DC drift voltage against time measured by resetting the history of applying bias voltage to the sample to the initial state and then applying an initial bias voltage of +10.0 V to the operating electrode 152, and a curve 316 indicates the change of the DC drift voltage against time measured by resetting the history of applying bias voltage to the sample to the initial state and then adding an initial bias voltage of −10.0 V to the operating electrode 152.

In FIG. 3A, as illustrated by the curves 300 to 306, the absolute values of the drift voltage have a tendency of gradually increasing (300 and 302) or saturating toward a voltage of a certain constant value (304 and 306).

In contrast, in FIG. 3B, the curves 310 to 314 exhibit almost the same tendency as that of the curves 300 to 304 in FIG. 3A; however, as the curve 316 shows, the absolute value of the drift voltage with the negative initial bias voltage of −10.0 V abruptly increases against the elapsed time.

In the range of applying bias voltage of ±14 V, the similar tendency is shown in the case of applying both positive and negative; however, in the case of the initial voltage being negative, the absolute value abruptly changes from the applied bias voltage of about −15 V, and the drift phenomenon is accelerated. The reason is likely to be considered that the number of carriers in the buffer layer is increased due to the injection of electrons from the electrodes into the buffer layer so that the function that space charges in the buffer layer negate external electric fields generated by potential differences between the electrodes is intensified. Since the electrode gap in the modulator for the samples is 14 μm, the electric field applied in this case is approximately 1.1 V/μm.

The change of the applied voltage is also larger in a case where a positive bias voltage is applied. However, a difference in the change of the applied voltage from FIG. 3A is not so large comparing to the case where a negative bias voltage is applied. Meanwhile, in LN optical modulator without a buffer layer, since a significant difference is observed in the behavior of the DC drift between the case of applying positive bias voltage and the case of applying negative bias voltage at an electric field intensity of approximately 2 V/μm, it is considered that carrier injection from metal electrode into LN crystal at the electric field intensity, it is probably electron injection estimating from the polarity, would start to occur.

In a modulator with a buffer layer including $TiO_2$ and $In_2O_3$, there are no clear changes observed even when an electric field of 2 V/μm or more is applied between the bias electrodes. The cause of this phenomenon would be estimated that the bias drift of the modulator with a buffer layer is come by space charges of carriers mainly in the buffer layer and there is difference between possibility of carrier injection from the metal electrode into LN and one of carrier injection from the buffer layer which is dielectric material to LN.

The phenomenon of the DC drift voltage being abruptly increased when a negative electric field of approximately 1 V/μm is applied thereto is dependent on the above-described concentration percentage of the molar concentration ratio between $In_2O_3$ and $TiO_2$ (=[the molar concentration ratio of $TiO_2$]/[the molar concentration ratio of $In_2O_3$]). When the quality determination criterion of the characteristics which can be used in practical use at the point of the amount of the increase of DC drift like the above described is defined as, for example, the ratio (change ratio) between the amount of change (absolute values) of the respective DC drift voltages in a case in which the bias voltage initial value is positive or negative is 2 or less at an elapsed time of 500 hours, the samples a to f shown in Table 1 are shown like Table 2 ("small" in the table indicates the change ratio is less than 2, and "large" indicates the change ratio is 2 or more), and the samples are classified into a group of the sample a to c in which the drift voltage changes are small and a group of the sample d to f in which the changes are large.

TABLE 2

| Bias voltage initial value | Sample a | Sample b | Sample c | Sample d | Sample e | Sample f |
|---|---|---|---|---|---|---|
| ±3.5 V | Small | Small | Small | Small | Small | Small |
| ±10.0 V | Small | Small | Small | Large | Large | Large |

Figure 4:
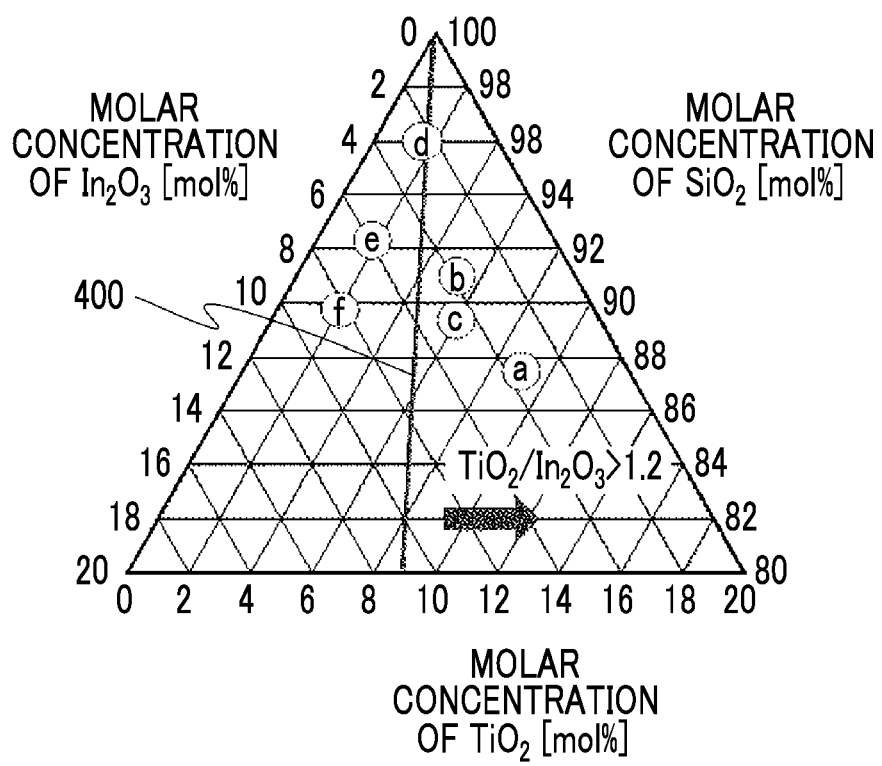
FIG. 4 is a view on which the compositions of the buffer layers in a waveguide type optical element used for the evaluation of the drift voltage change against elapsed time are plotted.

In addition, from the comparison between Tables 1 and 2, it is possible to obtain a concentration percentage of the molar concentration ratio between $In_2O_3$ and $TiO_2$=1.2 as the boundary value of these two groups. FIG. 4 is a view on which the compositions of the non-conductive layers 120 in the samples a to f are plotted in a triangle with three sides respectively indicating the compositional ratios of $SiO_2$, $In_2O_3$, and $TiO_2$. It is plotted by white circles in the drawing, and the names (a to f) of the corresponding samples are indicated in the white circles. In the drawing as well, it is found that the samples are divided into two groups of the sample a to c and the sample d to f by a straight line 400 which indicates a concentration percentage of 1.2 as the boundary. The invention of the present application is to reduce the change of the drift voltage over time by constituting the non-conductive layer 120 so that the concentration percentage becomes particularly more than 1.2 based on the above-described knowledge.

Meanwhile, the voltage with which the drift is abruptly accelerated in the case of a negative initial bias voltage is also dependent on the thickness of the buffer layer. It is experientially found that, even in the case of the same electrode gap and the same composition of the buffer layer, there is a tendency that, when the buffer layer is thinner, the voltage with which the drift increases becomes lower, and, when the buffer layer is thicker, the voltage becomes higher. In a case in which the thickness of the buffer layer is 0.55 μm and 1.0 μm, the voltages with which the drift abruptly increases are approximately 14 V and 17 V respectively, and the electric fields are approximately 1.0 V/μm and 1.2 V/μm respectively.

In addition to In and Ti, tin (Sn) may be doped into the buffer layer. Depending on the conditions for combining the atmosphere condition for forming Ti diffusion waveguides in LN, the process conditions for forming ridge waveguides, the conditions for an annealing treatment after the process, the conditions for forming the buffer layer, the annealing conditions of the buffer layer, and the like, the effect of suppressing the drift is enhanced on the both conditions of applying positive and negative. However, since the vapor pressure of Sn or tin oxide ($SnO_2$) is high, it becomes difficult to ensure the reproducibility of the buffer layer composition, and thus it is preferable to keep the concentration ratio of tin 1.5 mol % or less.

Hitherto, as described above, in the waveguide type optical element 10 described in the present embodiment, the non-conductive layer 120 includes silicon oxide, an oxide of indium, and an oxide of titanium, and the ratio between the molar concentration of the titanium oxide and the molar concentration of the indium oxide is 1.2 or more, it is possible to effectively prevent carriers from being injected into the buffer layer when an electric field of 1 V/μm or more is applied to the substrate.

REFERENCE SIGNS LIST

10 . . . waveguide type optical element, 100 . . . substrate, 102 . . . MZ-type optical waveguide, 104, 106 . . . parallel waveguide, 108, 110 . . . RF electrode, 112, 114, 116 . . . ground electrode, 120 . . . non-conductive layer, 150 . . . bias electrode, 152, 154 . . . operating electrode, 160, 162, 164 . . . reference electrode, 252a, 254a, 260a, 262a, 264a . . . upper layer, 252b, 254b, 260b, 262b, 264b . . . base layer.

The invention claimed is:
1. A waveguide type optical element comprising:
a substrate having an electro-optic effect;
two optical waveguides disposed on a surface of the substrate;
a non-conductive layer which is disposed on the substrate and is made of a material having a lower dielectric constant than the substrate; and
a control electrode which is disposed on the non-conductive layer and generates a refractive index difference between the two optical waveguides by respectively applying electric fields to the two optical waveguides,
wherein the non-conductive layer is constituted of a material which includes silicon oxide, an oxide of indium, and an oxide of titanium, a ratio of a molar concentration of the titanium oxide to a molar concentration of the indium oxide being 1.2 or more, the control electrode is a bias electrode for compensating for a drift phenomenon and is constituted of working electrodes disposed on the optical waveguides and a reference electrode disposed on a portion other than regions provided with the optical waveguides on the surface of the substrate, and a voltage which is a negative voltage relative to a potential of the reference electrode and generates an electric field of 1 V/μm or more in the substrate is applied to the working electrode.

2. The waveguide type optical element according to claim 1, wherein the control electrode is constituted of a base layer that is disposed on the non-conductive layer and an upper layer that is disposed on the base layer, and the base layer is titanium.

3. The waveguide type optical element according to claim 1, wherein the substrate is made of lithium niobate, and the two optical waveguides are two parallel waveguides constituting a Mach-Zehnder-type optical waveguide.

4. A waveguide type optical element comprising:

a substrate having an electro-optic effect;

two optical waveguides disposed on a surface of the substrate;

a non-conductive layer which is disposed on the substrate and is made of a material having a lower dielectric constant than the substrate; and a control electrode which is disposed on the non-conductive layer and generates a refractive index difference between the two optical waveguides by respectively applying electric fields to the two optical waveguides, wherein the non-conductive layer is constituted of a material which includes silicon oxide, an oxide of indium, and an oxide of titanium, a ratio of a molar concentration of the titanium oxide to a molar concentration of the indium oxide being 1.2 or more in a range in which the molar concentration of the titanium oxide is not 5.0 mol %, the control electrode is a bias electrode for compensating for a drift phenomenon, and a voltage generating an electric field of 1 V/μm or more in the substrate is applied to the control electrode.

5. A waveguide type optical element comprising:

a substrate having an electro-optic effect;

two optical waveguides disposed on a surface of the substrate;

a non-conductive layer which is disposed on the substrate and is made of a material having a lower dielectric constant than the substrate; and a control electrode which is disposed on the non-conductive layer and generates a refractive index difference between the two optical waveguides by respectively applying electric fields to the two optical waveguides, wherein the non-conductive layer is constituted of a material which includes silicon oxide, an oxide of indium, and an oxide of titanium, a ratio of a molar concentration of the titanium oxide to a molar concentration of the indium oxide being 1.2 or more, the control electrode is a bias electrode for compensating for a drift phenomenon, and a voltage generating an electric field of 1.2 V/μm or more in the substrate is applied to the control electrode.

* * * * *